United States Patent
Mays, II et al.

(10) Patent No.: US 8,810,146 B1
(45) Date of Patent: Aug. 19, 2014

(54) LIGHTING DEVICE WITH CIRCUIT AND METHOD FOR DETECTING POWER CONVERTER ACTIVITY

(75) Inventors: Stephen D. Mays, II, Madison, AL (US); Philip Walker, Manchester, TN (US)

(73) Assignee: Universal Lighting Technologies, Inc., Madison, AL (US)

( * ) Notice: Subject to any disclaimer, the term of this patent is extended or adjusted under 35 U.S.C. 154(b) by 465 days.

(21) Appl. No.: 13/289,523

(22) Filed: Nov. 4, 2011

(51) Int. Cl.
*H05B 41/16* (2006.01)

(52) U.S. Cl.
USPC .......... 315/247; 315/278; 315/291; 315/307; 315/185 S

(58) Field of Classification Search
USPC ....... 315/247, 246, 276–280, 291, 307, 185 S
See application file for complete search history.

(56) References Cited

U.S. PATENT DOCUMENTS

| | | | |
|---|---|---|---|
| 5,396,153 A | 3/1995 | Shackle | |
| 5,574,336 A | 11/1996 | Konopka et al. | |
| 5,619,105 A | 4/1997 | Holmquest | |
| 5,729,098 A | 3/1998 | Konopka et al. | |
| 5,767,631 A | 6/1998 | Konopka et al. | |
| 5,982,106 A | 11/1999 | Bobel | |
| 6,034,488 A | 3/2000 | Lindauer et al. | |
| 6,525,490 B1 | 2/2003 | Rinaldi | |
| 6,650,514 B2 | 11/2003 | Schmitt | |
| 6,674,248 B2 | 1/2004 | Newman, Jr. et al. | |
| 6,680,587 B1 | 1/2004 | Trestman et al. | |
| 6,720,739 B2 | 4/2004 | Konopka | |
| 6,724,602 B2 | 4/2004 | Giannopoulos | |
| 7,190,127 B2 | 3/2007 | Rudolph | |
| 7,208,887 B2 | 4/2007 | Mosebrook et al. | |
| 7,352,139 B2 | 4/2008 | Ribarich et al. | |
| 7,423,386 B2 | 9/2008 | Radzinski et al. | |
| 7,468,586 B2 | 12/2008 | Yu et al. | |
| 7,598,677 B2 | 10/2009 | Stack | |
| 7,619,367 B2 | 11/2009 | Van Zundert et al. | |
| 7,688,005 B2 | 3/2010 | Reid | |
| 7,804,256 B2 | 9/2010 | Melanson | |
| 2004/0084035 A1* | 5/2004 | Newton | 123/630 |
| 2013/0077353 A1* | 3/2013 | Kuang et al. | 363/20 |

* cited by examiner

*Primary Examiner* — Tuyet Thi Vo
(74) *Attorney, Agent, or Firm* — Waddey Patterson; Mark J. Patterson; Gary L. Montle

(57) ABSTRACT

A lighting device such as an electronic ballast or LED driver includes circuitry to detect power converter activity and act accordingly. A power factor correction (PFC) circuit includes an inductor, a power converter switch, and a PFC controller effective to provide driving signals the power converter switch to turn on and off. A power converter activity detection circuit includes a first capacitor coupled between the PFC controller and the power converter switch, a zener diode, and a second capacitor coupled between the first capacitor and ground. An output voltage for the power converter activity detection circuit as referenced from a node between the first capacitor and the second capacitor is representative of activity by the power converter switch, and is provided to a lighting device controller which may accordingly maintain operation of the lighting device where a mains power interruption is only temporary but would otherwise disable the device.

20 Claims, 3 Drawing Sheets

LIGHTING DEVICE WITH CIRCUIT AND METHOD FOR DETECTING POWER CONVERTER ACTIVITY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference:
None

BACKGROUND OF THE INVENTION

The present invention relates generally to lighting devices such as electronic ballasts and LED drivers. More particularly, the present invention relates to a circuit and method for detecting power converter activity in a lighting device and protecting associated circuitry in the event of a temporary interruption in the power converter activity.

In a lighting device such as an electronic ballast or LED driver, a temporary loss of mains power input, or the sudden loss of an output load, can cause the boost converter of an active power factor correction stage to suddenly stop operating. Many circuits of a low cost product depend on the constant operation of a boost converter, such as for example Low-Voltage, Low-Power (LVLP) circuits deriving power from the boost converter's main inductor, and High-Voltage, High-Power (HVHP) circuits that are sensitive to significant changes in the main bus voltage (Vbulk). Examples of LVLP circuits include power management circuits and self-protection circuits that may need to remain active during short absences of power from the boost converter. This is possible if the LVLP circuits are aware of the momentary power interruption and are capable of managing their power consumption during the interruption.

When the internal bus voltage Vbulk drops significantly, the output of HVHP circuits, such as the arc current of an electronic ballast, tends to decrease. As the current to the gas discharge lamp is reduced, the arc voltage increases accordingly. Inverter self-protection circuitry detects this voltage and latches the ballast controller IC in an off state. If the mains input power is interrupted for a short duration such as is the case with input arcing or momentary brown-out conditions, the bus voltage Vbulk will droop momentarily and the ballast self-protection circuitry will latch off the ballast, leaving the output disabled even though (and regardless of whether) the mains input power is subsequently reapplied. Therefore, it would be desirable to detect boost converter activity, and more particularly idleness in the boost converter.

With reference to one known arrangement for accomplishing this purpose, the output of a rectifier circuit coupled to the mains input terminals is measured and when the voltage drops, during for example a brown-out or input arcing condition (to be further referred to hereinafter as a Zero Mains Event—ZME), a voltage controlled switch such as a MOSFET will turn off. This in turn causes a series of switches to "crowbar" power to ballast controller IC's and to further reset voltages on various capacitors that can otherwise cause the ballast to latch off even when the mains power input is available.

This arrangement can be sensitive to the relative magnitude of the mains input. For a product designed to operate over a wide range of input voltages, this method can cause the circuitry to work improperly. Also, this method only detects a brown-out condition or a ZME, and will not detect a condition where the PFC controller IC is idle and the mains input is applied, such as where the bus voltage Vbulk overshoots and the Over Voltage Protection (OVP) circuit or module for the PFC controller IC halts the gating signals to the boost converter. While this situation may not be an issue for products where the LVLP circuitry is referenced to the same ground as the boost converter, this method does not work for products where the LVLP circuitry is referenced to an isolated ground. This method would therefore not help LVLP circuitry conserve power derived from the boost converter while the boost converter is idle.

In another approach, the gate drive output signal from the PFC controller IC may be measured using a resistor divider. Buffered by two cascading switches, the gate drive signal is used to keep the average voltage of a timing capacitor near zero volts. When an input arc occurs, the input capacitor is discharged by the boost converter and the PFC controller IC idles with the boost converter gate drive output high, which allows the timing capacitor to charge. Once the timing capacitor is charged, the ballast controller IC's will be crow-barred or reset.

In similar fashion to the previously described approach, this method will detect a ZME but will not detect other causes for an idle boost converter, such as when the over voltage protection (OVP) circuitry or program halts the gating signals to the boost converter. LVLP circuitry deriving power from the boost converter will not be prompted to conserve power when the boost converter is idle for any reason other than a ZME.

Referring now to a previously known approach such as represented in FIG. 1, rather than measuring the gate drive signal from the boost converter, the drain-to-source voltage of the boost converter switching element (e.g., FET) can be measured. Depending on the buffering stages between the sensing resistors R2, R3 connected across the drain and source and the output reset signal, this method will respond to either a ZME or a scenario such as when the OVP halts the gating signals to the boost converter.

BRIEF SUMMARY OF THE INVENTION

An object of the present invention is to indicate to lighting device controllers (e.g., LVLP control circuitry) what a power converter such as the input boost converter of an active PFC stage is doing. A lighting device in accordance with the present invention is provided with circuitry effective to detect boost converter activity, and more particularly idleness in the boost converter.

Transition mode, active power factor correction (PFC) controller IC's such as the ST L6562 have two different operation modes when idling. In a first mode, the gate drive output is high to turn on the boost converter switch when the mains input power is at zero volts, such as during input arcing conditions, and to prepare for reapplication of the mains. In a second operating mode for the PFC controller IC, the gate drive output is low to make sure the boost converter switch is off when mains input power is available but the PFC controller IC has driven the bus voltage Vbulk to the point of Over Voltage Protection (OVP), and the bus voltage Vbulk drains to a level determined by the PFC controller IC. The voltages to LVLP control circuits depending on power derived from the boost converter would generally droop while waiting for the boost converter to be active again.

In an embodiment, a lighting device such as an electronic ballast or LED driver in accordance with the present invention includes circuitry to detect power converter activity and act accordingly to maintain operation of the lighting device where otherwise it may be undesirably disabled. A power factor correction (PFC) circuit includes an inductor, a power converter switch, and a PFC controller effective to provide driving signals to cause the power converter switch to turn on and off. A power converter activity detection circuit includes a first capacitor coupled between the PFC controller and the power converter switch, a zener diode, and a second capacitor coupled between the first capacitor and ground. An output voltage for the power converter activity detection circuit as referenced from a node between the first capacitor and the second capacitor is representative of activity by the power converter switch.

In one aspect, after detection of power converter activity occurs the lighting device either conserves its LVLP source to maintain control or the lighting device resets circuitry designed to latch off the output which drives the output inverter and further powers the lamp.

In another aspect, a power converter activity detection circuit of the present invention directs the lack of boost converter action whether the circuitry to be protected is referenced to the same ground as the boost converter or referenced to an isolated ground.

DETAILED DESCRIPTION OF THE INVENTION

Figure 1:
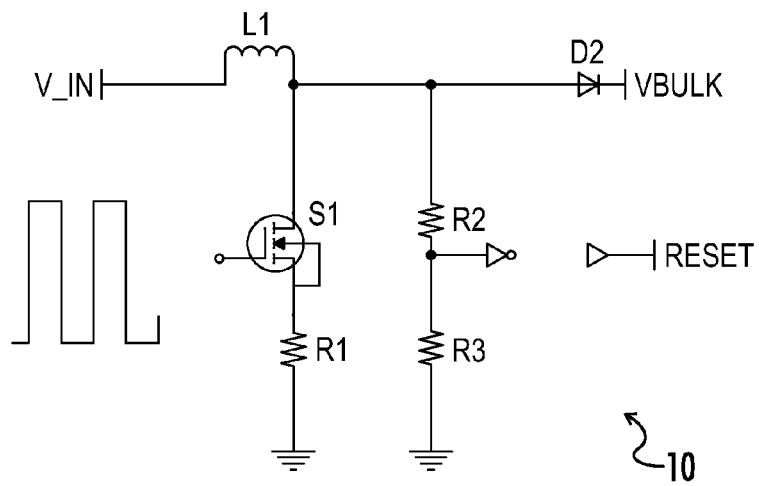
FIG. 1 is a circuit diagram representing a converter activity detection circuit as previously known in the art.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The term "controller" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Referring generally to FIGS. 2-7, various embodiments of converter activity detection circuits for lighting devices and associated methods of operation in accordance with the present invention may be further described herein. Where the various figures may describe embodiments sharing various common elements and features with other embodiments, similar elements and features are given the same reference numerals and redundant description thereof may be accordingly omitted below.

Various embodiments of a converter activity detection circuit 20 as described herein may be utilized by a lighting device such as for example an electronic ballast or an LED driver. An exemplary power converter may be a boost converter in a power factor correction (PFC) circuit, further including an inductor L1 positioned along a positive voltage rail for the lighting device (e.g., having a first end coupled to receive a rectified mains voltage V in and a second end coupled to a bus voltage Vbulk). A PFC switch S1 is coupled between the second end of the inductor L1 and PFC ground. A PFC controller IC is arranged to provide gate driving signals to turn the PFC switch S1 on and off. In one embodiment, the PFC controller IC may be a transition-mode PFC controller as is known in the art such as an ST L6562 produced by STMicroelectronics, Inc., and as further incorporated herein by reference.

As noted above, various PFC controller IC's such as the ST L6562 have two different behaviors in response to idling. During a zero mains event (ZME) the gate driver output signal (GD) may be high to turn on the PFC switch and prepare for reapplication of the mains power. While waiting for reapplication of the mains power, the bus voltage will begin to droop. Even though some electronic ballast controller IC's sweep down the output inverter frequency to compensate, eventually the arc current to the attached fluorescent lamps will also droop, causing the arc voltage to increase. Protection circuits will likely measure the increased arc voltage and latch off the ballast controller IC. When the mains power is subsequently reapplied, the ballast controller IC may still be latched off, causing an apparent problem. Alternatively, the gate driver output (GD) may be low when mains power is otherwise available but the PFC controller IC has driven the bus voltage Vbulk to the point of over-voltage protection as determined by the PFC controller IC or external circuitry associated with the lighting device. The voltages to LVLP control circuits associated with the lighting device which depend on power derived from the power converter (i.e., boost converter of the PFC circuit) will droop while waiting for the boost converter to resume activity.

In accordance with the present invention, a power converter activity detection circuit 20 is configured to detect the lack of boost converter activity, regardless of whether or not the circuitry to be protected is referenced to the same ground as the power converter or is referenced to an isolated ground. Once detection occurs, the lighting device may for example either conserve its LVLP source to maintain lighting control or the lighting device may reset circuitry which is designed to latch off the lighting output in response to the mains interruption event or condition.

Figure 2:
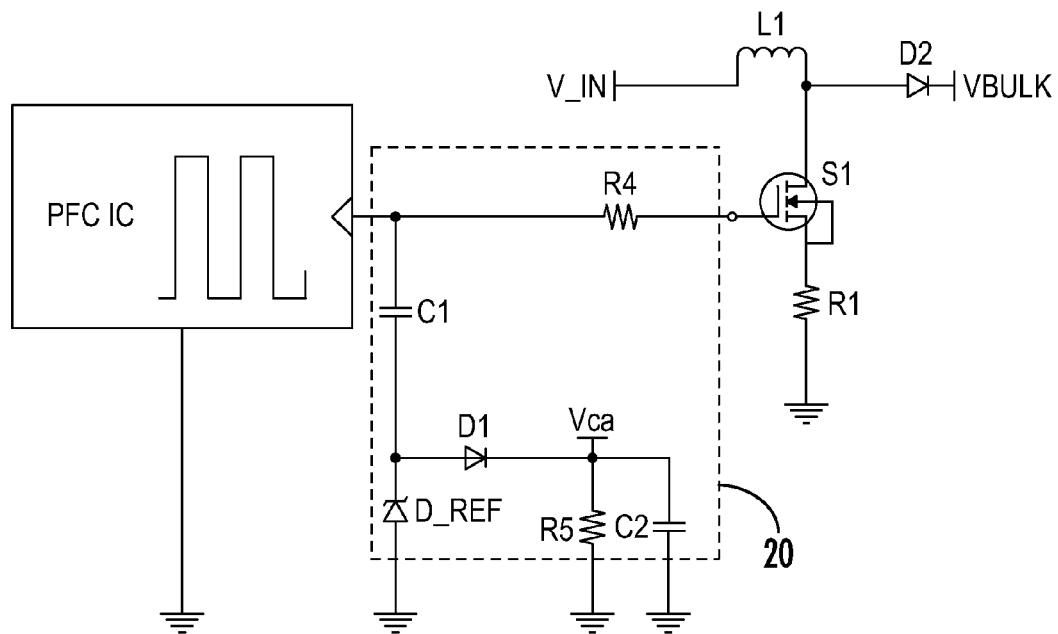
FIG. 2 is a circuit diagram representing one embodiment of a converter activity detection circuit in accordance with the present invention.

Referring to FIG. 2, an exemplary power converter activity detection circuit 20 may include a capacitor C1 coupled on a first end to a node between the gate driver output terminal for the PFC controller IC and the gate electrode of the PFC switch S1. A reference diode D_ref (e.g., a zener diode) has its cathode coupled to a second end of the capacitor C1 and its anode coupled to the PFC reference ground. Another diode D1 has its anode coupled between the reference diode D_ref and the capacitor C1. A resistor R5 and second capacitor C2 are coupled in parallel between the cathode of the diode D1 and the PFC reference ground. A voltage across the resistor R5 or otherwise taken from a node between the resistor R5, the capacitor C2 and the diode D1 may define an output voltage Vca for the exemplary power converter activity detection circuit 20, or alternatively stated a power converter activity detection voltage Vca. By using a capacitor to detect changes in the gate drive signal, boost converter activity is indirectly detected and LVLP circuitry can react accordingly in response to the output voltage Vca.

The reference diode D_ref may as shown in FIG. 2 be a zener diode configured to develop a specific output voltage, such as for example a 5.1 V zener diode to develop a logic level voltage, or may alternatively be any general purpose fast diode.

Figure 3:
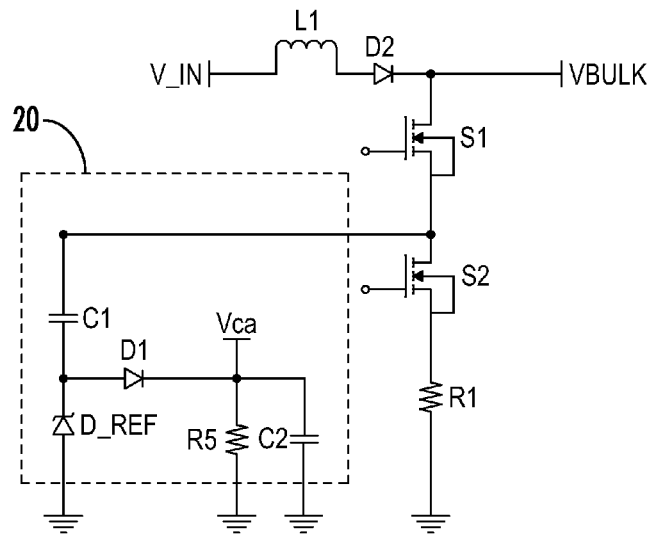
FIG. 3 is a circuit diagram representing another embodiment of a converter activity detection circuit in accordance with the present invention.

Referring now to FIG. 3, in another embodiment the power converter activity detection circuit 20 may be applied (in substantially the same configuration as that represented in FIG. 2) to an inverter design such as would be implemented by an electronic ballast for powering fluorescent lamps. In the example shown, the inverter design includes first and second switching elements S1, S2 coupled in series in a half-bridge topology. An alternative design with third and fourth switching elements further provided to define a full-bridge topology (not shown) would be within the scope of the present invention as well. In this embodiment, the capacitor C1 is coupled on its first end to the midpoint of the half-bridge inverter to detect power converter activity, as represented by the output voltage Vca in a substantially similar manner to that described above.

In another embodiment (not shown), a method of detecting converter activity using the power converter activity detection circuit 20 substantially as described above and represented in FIGS. 2-3 may be further applied for numerous other types of power converters employing a low side switch within the scope of the present invention, such as for example a flyback converter or a forward converter as are conventionally known in the art.

Figure 4:
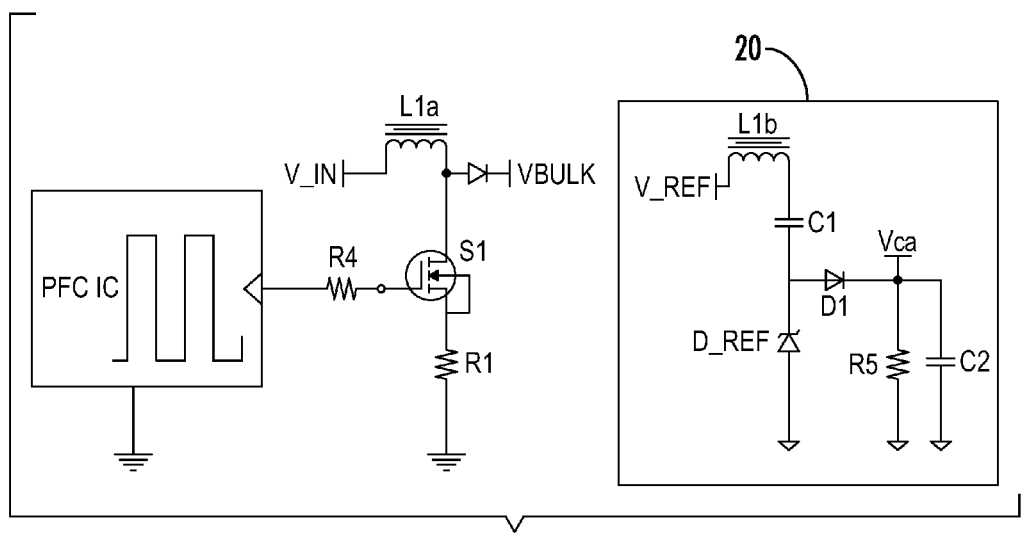
FIG. 4 is a circuit diagram representing another embodiment of a converter activity detection circuit in accordance with the present invention.

Referring now to FIG. 4, in an alternate approach another embodiment of a power converter activity detection circuit 20 may be employed in accordance with the present invention to enable LVLP circuitry that is isolated from the boost converter to detect power converter activity and further react appropriately. In the embodiment shown, the PFC inductor L1 has a first winding L1a which is arranged along the positive rail (as in the embodiment represented in FIG. 2) and a second winding L1b coupled on a first end to a reference voltage terminal V_ref. The capacitor C1 has its first end coupled to a second end of the second winding L1b. The various components of the power converter activity detection circuit 20 which were coupled to PFC ground with respect to the previous embodiments are alternatively coupled to an electrically isolated ground with respect to the PFC circuit. The reference voltage V_ref in the embodiment shown may be any voltage referenced to the ground of the electrically isolated circuit, including the ground of the electrically isolated circuit.

Figure 5:
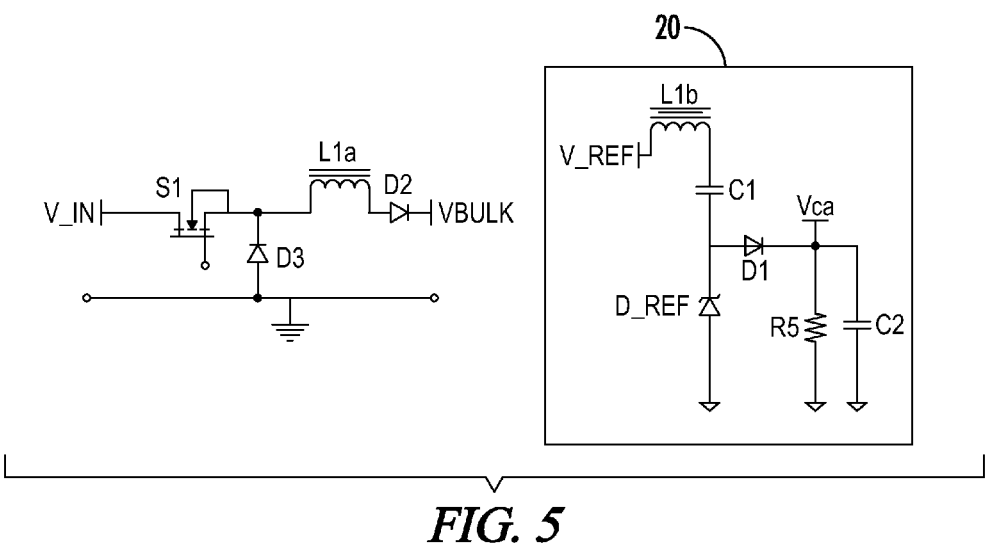
FIG. 5 is a circuit diagram representing another embodiment of a converter activity detection circuit in accordance with the present invention.

In another embodiment, the power converter activity detection circuit 20 may be applied (in substantially the same configuration as that represented in FIG. 4) to detect power converter activity by any converter with a high-side switch S1 such as for example a buck converter as shown in FIG. 5, or any other converter where isolation is necessary.

In various embodiments in accordance with the present invention as described above, it may be understood that an optional resistor may be placed in series with the first capacitor C1 to limit the magnitude of the current during voltage transitions.

Figure 6:
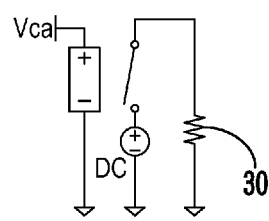
FIG. 6 is a circuit diagram representing an application for various embodiments of the converter activity detection circuit of the present invention.

Referring to FIG. 6, an example of an implementation of the power converter activity detection circuit 20 of the present invention may include coupling the output voltage Vca to a power supply circuit whereby a power source DC may be coupled to a load 30 including but not limited to the lighting controller (e.g., LVLP control circuitry) for a lighting device when the converter activity detection output voltage Vca exceeds a threshold value for the power supply switch.

Figure 7:
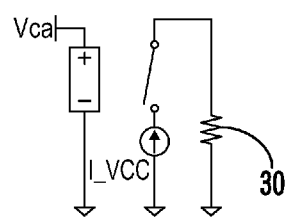
FIG. 7 is a circuit diagram representing another application for various embodiments of the converter activity detection circuit of the present invention.

Referring to FIG. 7, in another example of an implementation of the power converter activity detection circuit 20 of the present invention, the output voltage Vca may be coupled to a charge pump circuit to supply current I_vcc to auxiliary loads 30 when the converter activity detection output voltage Vca exceeds a threshold value for the charge pump switch.

The previous detailed description has been provided for the purposes of illustration and description. Thus, although there have been described particular embodiments of the present invention of a new and useful "Lighting Device with Circuit and Method for Detecting Power Converter Activity," it is not intended that such references be construed as limitations upon the scope of this invention except as set forth in the following claims.

What is claimed is:

1. A lighting device comprising:
a power factor correction (PFC) circuit comprising an inductor, a power converter switch, and a PFC controller effective to provide driving signals for causing the power converter switch to turn on and off;
a power converter activity detection circuit comprising
a first capacitor coupled on a first end to a node between the PFC controller and the power converter switch,
a diode having an anode coupled to ground and a cathode coupled to a second end of the first capacitor, and
a second capacitor coupled on a first end to the second end of the first capacitor and on a second end to ground; and
wherein an output voltage for the power converter activity detection circuit referenced from a node between the first capacitor and the second capacitor is responsive to activity by the power converter switch.

2. The lighting device of claim 1, further comprising:
a lighting device controller, a voltage source, and a switching element coupled between the voltage source and the lighting device controller; and
the switching element is responsive to open and close in accordance with a magnitude of the output voltage from the power converter activity detection circuit and a predetermined threshold value.

3. The lighting device of claim 2, the lighting device controller effective in response to the supplied voltage to maintain operation of the lighting device during a temporary interruption in mains input power.

4. The lighting device of claim 1, the diode of the power converter activity detection circuit further comprising a zener diode effective to develop a predetermined voltage at the reference node for the output voltage.

5. The lighting device of claim 4, the power converter activity detection circuit further comprising a resistor coupled in series with the first capacitor.

6. A lighting device comprising:
a power converter comprising first and second switches coupled in a half bridge configuration between a positive voltage rail and ground;
a lighting device controller effective to generate driver signals to the first and second switches for causing the switches to turn on and off;
a power converter activity detection circuit comprising
a first capacitor coupled on a first end to a node between the first and second switches of the power converter,
a diode having an anode coupled to ground and a cathode coupled to a second end of the first capacitor, and
a second capacitor coupled on a first end to the second end of the first capacitor and on a second end to ground;
wherein an output voltage for the power converter activity detection circuit referenced from a node between the first capacitor and the second capacitor is responsive to activity by the power converter.

7. The lighting device of claim 6, further comprising:
a voltage source and a switching element coupled between the voltage source and the lighting device controller; and
the switching element is responsive to open and close in accordance with a magnitude of the output voltage from the power converter activity detection circuit and a predetermined threshold value.

8. The lighting device of claim 7, the lighting device controller effective in response to the supplied voltage to maintain operation of the lighting device during a temporary interruption in mains input power.

9. The lighting device of claim 6, the diode of the power converter activity detection circuit further comprising a zener diode effective to develop a predetermined voltage at the reference node for the output voltage.

10. The lighting device of claim 9, the power converter activity detection circuit further comprising a resistor coupled in series with the first capacitor.

11. The lighting device of claim 6, the first and second switches of the power converter defining a first switch pair, the power converter further comprising third and fourth switches coupled in series to define a second switch pair, the first and second switch pairs coupled in parallel between the bulk voltage rail and ground in a full bridge configuration.

12. The lighting device of claim 11, the first capacitor coupled on its first end to either or both of the node between the first and second switches of the power converter and a node between the third and fourth switches of the power converter.

13. A lighting device comprising:
a power converter comprising
a first inductive winding,
a power converter switch, and
a controller effective to provide driving signals for causing the power converter switch to turn on and off;
a power converter activity detection circuit comprising
a second inductive winding magnetically coupled to the first inductive winding, the second inductive winding having first and second ends, the first end of the second inductive winding coupled to a reference voltage terminal,
a first capacitor coupled on a first end to a second end of the second inductive winding,
a diode having an anode coupled to ground and a cathode coupled to the second end of the first capacitor, and
a second capacitor coupled on a first end to the second end of the first capacitor and on a second end to ground;
wherein an output voltage for the power converter activity detection circuit referenced from a node between the first capacitor and the second capacitor is representative of activity by the power converter; and
wherein the power converter and the power converter activity detection circuit are electrically isolated via the first and second inductive windings.

14. The lighting device of claim 13, the first inductive winding and the power converter switch coupled in series along a positive voltage rail to define a buck converter.

15. The lighting device of claim 13, the diode of the power converter activity detection circuit further comprising a zener diode effective to develop a predetermined voltage at the reference node for the output voltage.

16. The lighting device of claim 15, the power converter activity detection circuit further comprising a resistor coupled in series with the first capacitor.

17. The lighting device of claim 13, further comprising:
the first inductive winding having first and second ends coupled along a positive voltage rail;
the power converter switch coupled between the second end of the first inductive winding and a circuit ground electrically isolated with respect to the circuit ground for the power converter activity detection circuit; and
the first inductive winding and the power converter switch defining a boost converter for a power factor correction (PFC) circuit.

18. The lighting device of claim 17, further comprising:
an auxiliary load, a current source, and a switching element coupled between the current source and the auxiliary load; and
the switching element is responsive to a magnitude of the output voltage from the power converter activity detection circuit being greater than a threshold value to close and thereby supply a current associated with the current source to the auxiliary load.

19. The lighting device of claim 17, further comprising:
a lighting device controller, a voltage source, and a switching element coupled between the voltage source and the lighting device controller; and
the switching element responsive to open and close in accordance with a magnitude of the output voltage from the power converter activity detection circuit and a predetermined threshold value.

20. The lighting device of claim 19, the lighting device controller effective in response to the supplied voltage to maintain operation of the lighting device during a temporary interruption in mains input power.

\* \* \* \* \*